United States Patent Office 3,498,994
Patented Mar. 3, 1970

3,498,994
CERTAIN 1,2,3,6-TETRAHYDRO-4-PYRIDYL KETONES
Hans Herbert Kuhnis, Hugo Ryf, and Rolf Denss, Basel, Switzerland, assignors to Geigy Chemical Corporation, Ardsley, N.Y., a corporation of New York
No Drawing. Continuation-in-part of application Ser. No. 520,093, Jan. 12, 1966, which is a continuation-in-part of application Ser. No. 382,955, July 15, 1964. This application Sept. 29, 1967, Ser. No. 671,549
Claims priority, application Switzerland, July 26, 1963, 9,053/63
Int. Cl. C07d 29/34
U.S. Cl. 260—297                 8 Claims

ABSTRACT OF THE DISCLOSURE

The compounds are of the class of 1,2,3,6-tetrahydropyridine derivatives substituted in 4-position by a keto alkyl group useful as analgesic and antitussive agents. An illustrative embodiment is 1-(1'-methyl-1',2',3',6'-tetrahydro-4'-pyridyl)-2-propanone.

CROSS REFERENCE

This is a continuation-in-part application of pending application Ser. No. 520,093, filed Jan. 12, 1966, now U.S. Patent No. 3,408,357, which in turn is a continuation-in-part application of pending application Ser. No. 382,955 filed July 15, 1964, now U.S. Patent No. 3,366,638.

DESCRIPTION OF INVENTION

The present invention relates to compounds which may be characterized by the following Formula I

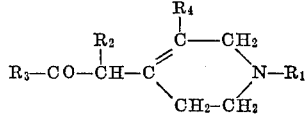
(I)

wherein
$R_1$ represents hydrogen, alkyl having at most 12 carbon atoms, alkenyl having from 3 to 5 carbon atoms, cyclopropylmethyl, or phenylalkyl having from 7 to 9 carbon atoms;
$R_2$ represents hydrogen or methyl;
$R_3$ represents alkyl having at most 4 carbon atoms, phenyl, phenylalkyl having from 7 to 9 carbon atoms, styryl or
$R_2$ and $R_3$ together represent an optionally methyl-substituted trimethylene to hexamethylene radical, preferably tetramethylene or 1-methyl tetramethylene; and
$R_4$ represents hydrogen or methyl;
and their salts with inorganic and organic acids all of which are useful analgesic and antitussive agents.

Furthermore, the present invention relates to novel compositions containing a compound of the above-mentioned formulae for producing analgesic and antitussive effects in warm-blooded animals, especially mammals when administered in therapeutic doses.

The above-stated pharmacological properties are especially to be found in those compounds which fall under the Formula IA

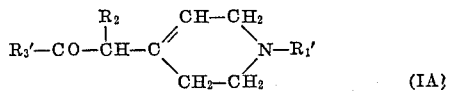
(IA)

wherein
$R_1'$ represents alkyl of from 1 to 4 carbon atoms;
$R_2$ has the same meaning as defined above; and
$R_3'$ represents alkyl of from 1 to 4 carbon atoms or phenyl.

Especially strong analgesics are those compounds according to the invention which fall under the Formula IB

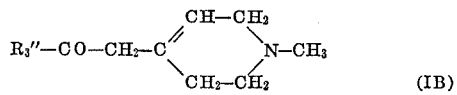
(IB)

wherein
$R_3''$ represents alkyl of from 1 to 3 carbon atoms.

These compounds are also distinguished by a surprisingly low toxicity compared wtih other strong analgesics.

In the above-described compounds $R_1$ is, for example hydrogen, alkyl radicals such as the methyl, ethyl, n-propyl, isopropyl, n-butyl, isobutyl, sec. butyl, n-amyl, isoamyl, n-hexyl, n-octyl, n-decyl or n-dodecyl radical; alkenyl radicals such as the allyl, crotyl or γ,γ-dimethylallyl radical, the cyclopropylmethyl radical or phenylalkyl radicals such as the benzyl, β-phenylethyl or -phenylpropyl radical. $R_3$ by itself represents, e.g. the methyl, ethyl, n-propyl isopropyl, n-butyl, isobutyl, sec. butyl, tert. butyl, phenyl, benzyl, α-methylbenzyl, α-phenylethyl, β-phenylethyl or styryl radical (β-phenylvinyl radical).

Also, together with $R_2$, $R_3$ forms, e.g. the trimethylene, tetramethylene, 1-methyl-tetramethylene, pentamethylene or hexamethylene radical.

To produce compounds of the general Formula I, a compound of the general Formula II

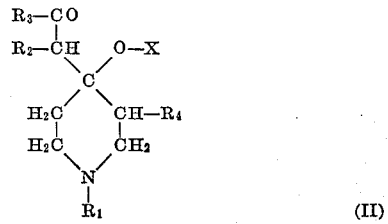
(II)

wherein X is hydrogen or an acyl radical and $R_1$, $R_2$, $R_3$ and $R_4$ have the meanings given in Formula I is treated, depending on the meaning of X, with an agent splitting off water or with an acid binding agent, or it is heated at a temperature sufficiently high to split off X—OH. An acyl radical X is preferably a low alkanoic acid acyl radical such as, e.g. the acetyl or propionyl radical which can easily be introduced, e.g. by treating compounds of the general Formula II wherein X is a hydrogen atom with acetanhydride or propionic acid anhydride at room temperature.

Because of the bond of the hydroxyl group or acyloxy group to a tertiary carbon atom, water or acid can be split off with various agents, sometimes even under mild conditions. For instance, heating for several hours in 1 N sodium hydroxide solution at 70–90° is sufficient to split off water as well as acetic acid or propionic acid. Nitrogen bases such as piperidine, quinoline, lutidine, collidine and piperazine are other basic agents for the splitting off of water or acid while heating. Examples of acid agents which split off water are concentrated sulphuric acid at room temperature or moderately raised temperatures up to about 60°, also polyphosphoric acid at temperatures around 100–150° and inorganic acid anhydrides and halides such as phosphorus pentoxide, boroxide, phosphorus trichloride, phosphorus oxychloride or thionyl chloride in suitable inert organic solvents such as e.g. chloroform at the boiling temperature thereof, also organic acids, acid anhydrides and halides such as formic acid, oxalic acid, p-toluene sulphonic acid, acetanhydride, phthalic acid anhydride, acetyl chloride and acetyl bromide at moderately raised to boiling temperature. Other suitable agents for splitting off water are, e.g. potassium bisulphate, dimethyl sulphoxide, phenyl isocyanate and ion exchanger resins, e.g. condensation products of phenol sulphonic acids and formaldehyde.

Processes for preparing compounds of the general Formula II used as starting material are described in copending application Ser. No. 520,093, filed Jan. 22, 1966, copending application Ser. No. 382,955, filed July 15, 1964.

According to this invention, the compounds of the above-mentioned Formula I are administered to warm-blooded animals, especially mammals for the purpose of treating pain and tussive irritation. In contrast to other known analgesics, the instantly claimed compounds have no parasympatholytic properties but rather a parasympathomimetic action. At the same time, they have surprisingly low toxicity. The presently claimed compounds exhibit mild to strong analgesic activity as well as antitussive activity.

The compounds of Formula I and their salts with inorganic and organic acids may be administered orally, rectally and parenterally.

The daily dosages of the free bases or of non-toxic salts thereof vary between 1 and 500 mg. for adult patients. Suitable dosage units such as dragées (sugar coated tablets), tablets, suppositories or ampoules, preferably contain 1–200 mg. of an active substance according to the invention or of a non-toxic salt thereof.

By non-toxic salts of the bases usable according to the invention are meant salts with those acids the anions of which are pharmacologically acceptable in the usual dosages, i.e. those which have no toxic effects. It is also of advantage if the salts to be used crystallize well and are not or are only slightly hygroscopic. As non-toxic salts instead of the free bases, for example, the salts with hydrochloric acid, hydrobromic acid, sulphuric acid, phosphoric acid, methane sulphonic acid, ethane sulphonic acid, $\beta$-hydroxyethane sulphonic acid, acetic acid, malic acid, tartaric acid, citric acid, benzoic acid, salicyclic acid, phenyl acetic acid, mandelic acid and embonic acid can be used as active substances.

For such administration, the incorporation of a pharmaceutical carrier for the formation of a pharmaceutical composition is highly desirable. Such compositions for use to produce analgesic and antitussive effects comprise a pharmaceutically acceptable carrier and a compound of Formula I which are administered in dosage unit forms acceptable for internal administration.

Such suitable compositions include, without limitation, tablets, capsules, powders, solution suspensions, sustained release formulations and the like.

To produce dosage units for peroral application containing a compound of one of Formula I, or a pharmaceutically acceptable addition salt thereof as active substance, the latter is combined, for example, with solid, pulverulent carriers such as lactose, saccharose, sorbital, mannite; starches such as potato starch, corn starch or amylopectin, also laminaria powder or citrus pulp powder; cellulose derivatives or gelatine, also lubricants such as magnesium or calcium stearate or polyethylene glycols of waxy consistency (Carbowaxes) may be added to form tablets or dragée centers. The latter are coated, for example, with concentrated sugar solutions which, e.g. can contain gum arabic, talcum and/or titanium dioxide, or they are coated with a lacquer dissolved in easily volatile oragnic solvents or mixtures of organic solvents. Dyestuffs can be added to these coatings, for example, to distinguish between different contents of active substance. Soft gelatine capsules (pearl-shaped closed capsules) and other closed capsules consist, for example, of a mixture of gelatine and glycerine, and contain, e.g. mixtures of the active substance with Carbowax, and hard gelatine capsules contain, for example, granulates of the active substance with solid, pulverulent carriers such as, for example, lactose, saccharose, sorbitol, mannite; starches such as potato starch, corn starch or amylopectin, cellulose derivatives or gelatine, as well as magnesium stearate or stearic acid. Suppositories are employed as dosage units for rectal application. These consist of a combination of the active substance with a neutral fatty base, or also gelatine rectal capsules can be employed which consist of a combination of the active substance with polyethylene glycols of waxy consistency (Carbowaxes).

Syrups or suspensions for peroral application consist, for example, of a solution containing at least about 2% and at most about 20% by weight of active substance, sugar and a mixture of ethanol, water and glycerin as well as propyleneglycol and, for example, aroma, saccharine and/or carboxymethylcellulose (for suspension purpose).

Ampoules for parenteral application by injection advtantageously contain a water soluble pharmaceutically acceptable salt of the active substance according to the invention in a concentration of advantageously 0.5–10%, optionally together with suitable stabilizing agents and/or buffer substances in aqueous solution.

The following non-limitative examples illustrate the production of compounds according to the invention.

EXAMPLE I

Manufacturing instructions for the production of a syrup containing 5% (weight per volume) of active substance of Formula I

| | | |
|---|---|---|
| Active substance | g | 5.0 |
| Saccharine | g | 0.6 |
| Sugar | g | 3.0 |
| Glycerin | g | 5.0 |
| Distilled water | g | 10.0 |
| Aroma | g | 0.1 |
| Ethanol 96% | ml. ad | 100.0 |

Sugar and saccharine are dissolved in hot distilled water. On cooling, the solution is made up to weight with water and glycerin is added. The aqueous solution is poured into the solution of active substance and aroma in about 65 ml. of ethanol and then made up to 100 ml. with ethanol.

As active substance for an antitussive syrup can be used, for example, $\alpha$ - (1' - methyl - methyl-1',2',3',6'-tetrahydro - 4' - pyridyl) - 3-methyl-2-butanone, or one of their pharmaceutically acceptable acid addition salts.

EXAMPLE II 250 g. of active substance are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance. The tablets can be marked with break lines if desired to enable a closer adaption of the dosage to be made. As active substance can be used 2-(1'-methyl-1',2',3',6' - tetrahydro - 4'-pyridyl)-3-pentanone. This gives analgesic tablets.

EXAMPLE III

A granulate is prepared from 250 g. of active substance, 175.90 g. of lactose and the alcoholic solution of 10 g. of stearic acid. After drying, the granulate is mixed with 56.60 g. of colloidal silicium dioxide. 165 g. of talcum, 20 g. of potato starch and 2.50 g. of magnesium stearate and pressed into 10,000 dragée centers. These are first coated with 6 g. of shellack, then with a concentrated syrup of 502.28 g. of crystallized saccharose, 10 g. of gum arabic, 0.22 g. of dyestuff of 1.5 g. of titanium dioxide, and dried. The dragées obtained each weigh 120 mg. and contain 25 mg. of 3 - (1'-methyl-1',2',3',5'-tetrahydro-4'-pyridyl)-2-butanone. These dragées can serve as analgesics.

EXAMPLE IV 1.0 g. of 1 - (1' - methyl - 1',2',3',6'-tetrahydro-4'-pyridyl)-2-butanone-citrate and 0.10 g. of ascorbic acid, are dissolved in distilled water up to 100 ml. This solution is used to fill ampoules, each e.g. of 1 ml. which corresponds to a content of 10 mg. of active substance, which are sterilized by heating in the usual way.

EXAMPLE V (a) 120 g. of Amberlite IRA 400 (OH$^\ominus$) are stirred for 15 hours at room temperature with 2 N sodium hydroxide solution and then washed neutral. 67.8 g. of 1-methyl-4-piperidone are added dropwise within 5 hours while stirring well to a mixture of the 120 g. of Amberlite IRA 400 (OH$^\ominus$) so prepared and 176 g. of acetone, and the mixture is then stirred for another 19 hours. The ion exchanger is then filtered off and washed with methanol and the filtrate is evaporated in vacuo in a rotary evaporator. The crude product is distilled under high vacuum whereupon 1 - (1' - methyl-4'-hydroxy-4'-piperidyl)-2-propanone is obtained. B.P.$_{0.01}$75°. To convert into a crystalline salt, the above base is dissolved in acetone and a saturated solution of citric acid in acetone is added while stirring until the solution has an acid reaction. The salt which precipitates is filtered off and recrystallised from acetone/methanol. The citrate of 1 - (1' - methyl-4'-hydroxy-4'-piperidyl)-2-propanone melts at 103–105°.

(b) 5.1 g. of 1 - (1' - methyl-4'-hydroxy-4'-piperidyl)-2-propanone and 50 ml. of acetyl chloride are refluxed for 1 hour. The reaction mixture is then evaporated in a rotary evaporator, ice is added to the residue, it is made alkaline with concentrated potassium hydroxide solution and extracted with chloroform. The extract is dried over sodium sulphate and concentrated and the residue is distilled whereupon the reaction product boils at 65–68° under 0.01 torr.

The above distillate is dissolved in acetone and a saturated solution of citric acid in acetone is gradually added while stirring until the solution has an acid reaction (pH 4). The citrate of 1 - (1' - methyl - 1',2',3',6'-tetrahydro - 4' - pyridyl) - 2-propanone which precipitates is filtered and recrystallized from methanol/acetone. M.P. 153–154°.

The following compounds, for example, can also be obtained by the process described above:

1-(1'-methyl-1',2',3',6'-tetrahydro-4'-pyridyl)-2-butanone citrate M.P. 135–136°, from 1-(1'-methyl-4'-hydroxy-4'-piperidyl)-2-butanone, B.P.$_{0.01}$95° (citrate M.P. 145–146°);

1-(1'-methyl-1',2',3',6'-tetrahydro-4'-pyridyl)-2-pentanone, citrate M.P. 131–133°, from 1-(1'-methyl-4'-hydroxy-4'-piperidyl)-2-pentanone, B.P.$_{0.003}$119–121° (citrate M.P. 126–128°);

1-(1'-methyl-1',2',3',6'-tetrahydro-4'-pyridyl)-1-methyl-2-butanone, citrate M.P. 122–123°, from 1-(1'-methyl-4'-hydroxy-4'-piperidyl)-3-methyl-2-butanone, B.P.$_{0.005}$85° (citrate M.P. 132–134°);

1-(1'-methyl-1',2',3',6'-tetrahydro-4'-pyridyl)-2-hexanone, citrate M.P. 117–119°, from 1-(1'-methyl-4'-hydroxy-4'-piperidyl)-2-hexanone, B.P.$_{0.01}$116–118°;

1-(1',3'-dimethyl-1',2',3',6'-tetrahydro-4'-pyridyl)-2-propanone, citrate M.P. 120°, from 1-(1',3'-dimethyl-4'-hydroxy-4'-piperidyl)-2-propanone, citrate M.P. 120°;

2-(1'-methyl-1',2',3',6'-tetrahydro-4'-pyridyl)-cyclohexanone, citrate M.P. 126–129°, from 2-(1'-methyl-4'-hydroxy-4'-piperidyl)-cyclohexanone, B.P.$_{0.01}$125°;

2-(1'-methyl-1',2',3',6'-tetrahydro-4'-pyridyl)-6-methyl-cyclohexanone, M.P. 96–96°, from 2-(1'-methyl-4'-hydroxy-4'-piperidyl)-6-methyl-cyclohexanone B.P.$_{0.002}$119–124°;

1-(1'-n-propyl-1',2',3',6'-tetrahydro-4'-pyridyl)-2-propanone hydrochloride, M.P. 148–149°, from 1-(1'-n-propyl-4'-hydroxy-4'-piperidyl)-2-propanone, B.P.$_{0.01}$ 80–82°, hydrochloride M.P. 137–139°;

1-(1'-n-hexyl-1',2',3',6'-tetrahydro-4'-pyridyl)-2-propanone from 1-(1'-n-hexyl-4'-hydroxy-4'-piperidyl)2-propanone, B.P.$_{0.005}$ 98°;

1-(1'-benzyl-1',2',3',6'-tetrahydro-4'-pyridyl)-2-propanone, hydrochloride, M.P. 184–186°, from 1-(1'-benzyl-4'-hydroxy-4'-piperidyl)-2-propanone, hydrochloride, M.P. 166–158°;

1-[1'-($\beta$-phenylethyl)-1',2',3',6'-tetrahydro-4'-pyridyl]-2-propanone, hydrochloride, M.P. 177–1790, from 1-[1'-($\beta$-phenylethyl)-4'-hydroxy-4'-piperidyl]-2-propanone hydrochloride, M.P. 127–129°;

1-(1'-allyl-1',2',3',6'-tetrahydro-4'-pyridyl)-2-propanone, B.P.$_{0.01}$ 74–80°, citrate M.P. 75–78°, from 1-(1'-allyl-4'-hydroxy-4'-piperidyl)-2-propanone, citrate M.P. 75–78°;

$\alpha$-(1'-methyl-1',2',3',6'-tetrahydro-4'-pyridyl)-acetophenone, citrate M.P. 143–145°, from $\alpha$-(1'-methyl-4'-hydroxy-4'-piperidyl)-acetophenone, B.P.$_{0.01}$ 123–125°, hydrochloride M.P. 146–147°;

1-(1'-methyl-1',2',3',6'-tetrahydro-4'-pyridyl-3-phenyl-2-propanone, from 1-(1'-methyl-4'-hydroxy-4'-piperidyl)-3-phenyl-2-propanone B.P.$_{0.003}$ 132–135°; and 1-(1'-methyl-1',2',3',6'-tetrahydro-4'-pyridyl)-3-benzylidene-2-propanone, from 1-(1'-methyl-4'-hydroxy-4'-piperidyl)-3-benzylidene-2-propanone, citrate M.P. 165–167°.

EXAMPLE VI 3 g. of 1-(1'-methyl-4'-hydroxy-4'-piperidyl) - 2 - propanone and 30 ml. of acetanhydride are refluxed for 3 hours. The reaction mixture is then concentrated in vacuo, water is added to the residue, the reaction is made alkaline with potassium hydroxide solution and it is extracted with chloroform. The chloroform solution is dried over sodium sulphate and concentrated, the residue is distilled and the reaction product, which boils at 65–68° under 0.01 mm. is converted into the citrate described in Example V of 1-(1'-methyl-1',2',3',6'-tetrahydro-4'-pyridyl)-2-propanone.

EXAMPLE VII 3 g. of 1-(1'-methyl-4'-hydroxy-4'-piperidyl) - 2 - propanone and 10 ml. of concentrated sulphuric acid are heated for 30 minutes at 60°. After cooling, the reaction mixture is poured onto ice, the sulphuric acid solution obtained is made alkaline with concentrated potassium hydroxide solution and extracted with chloroform. The chloroform solution is dried over sodium sulphate and concentrated and the residue is distilled under high vacuum. The reaction product obtained, B.P.$_{0.01}$ 65–68°, is converted into the citrate of 1-(1'-methyl-1',2',3',6'-tetrahydro-4'-pyridyl)-2-propanone described in Example V.

EXAMPLE VIII 3 g. of 1-(1'-methyl-4'-hydroxy-4'-piperidyl) - 2 - propanone and 10 g. of polyphosphoric acid are heated for 5 hours at 120°. After cooling, the reaction mixture is decomposed with ice and worked up as described in Example VII. The citrate there mentioned is obtained.

EXAMPLE IX 2 g. of 1-(1'-methyl-4'-hydroxy-4'-piperidyl) - 2 - propanone in 10 ml. of abs. chloroform and 1.73 g. of phosphorus oxychloride are refluxed for 3 hours. The reaction mixture is decomposed with ice and further worked up analogously to Example VII to obtain the citrate there mentioned.

Instead of phosphorus oxychloride, also 1.32 g. of thionyl chloride or 1.51 g. of phosphorus trichloride can be used with otherwise completely the same process.

EXAMPLE X 2 g. of 1-(1'-methyl-4'-hydroxy-4'-piperidyl) - 2 - propanone and 10 ml. of piperidine are refluxed for 20 hours. The piperidine is then distilled off under reduced pressure, sodium hydroxide solution is added to the residue and it is extracted with chloroform. The chloroform solution is dried over sodium sulphate and concentrated, the residue is distilled under high vacuum and the reaction product, B.P.$_{0.01}$ 65–68°, is converted into the citrate of 1-(1'-methyl-1',2',3',6'-tetrahydro-4'-pyridyl) - 2 - propanone which melts at 153–154° (cf. Example V).

EXAMPLE XI 2 g. of 1-(1'-methyl-4'-hydroxy-4'-piperidyl) - 2 - propanone and 10 ml. of 1 N sodium hydroxide solution are heated for 6 hours at 60°. After cooling, the citrate mentioned in Example X is obtained by extracting with chloroform and then proceeding analogously to Example X.

EXAMPLE XII 2 g. of 1-(1'-methyl-4'-acetoxy-piperidyl)-2-propanone and 10 ml. of 1 N sodium hydroxide solution are heated for 5 hours at 70° and then for 5 hours at 90°. After cooling, it is extracted with chloroform and the product is worked up analogously to Example X to obtain the citrate there mentioned.

Instead of the above acetoxy compound, also 2 g. of 1 - (1' - methyl - 4' - propionyloxy - 4' - piperidyl) - 2-propanone can be used.

EXAMPLE XIII 2 g. of 1-(1'-methyl-4'-acetoxy-4'-piperidyl) - 2 - propanone and 5 ml. of concentrated sulphuric acid are left to stand for 15 hours and then heated for 15 minutes at 60°. After adding ice and working up analogously to Example VII the citrate there mentioned is obtained.

Instead of the above acetoxy compound, also 2 g. of 1 - (1' - methyl - 4' - propionyloxy - 4' - piperidyl) - 2-propanone can be used.

EXAMPLE XIV (a) 12 g. of finely pulverised hydrochloride of 4-piperidone are added at —20° to 20 g. of finely pulverised sodium hydroxide in 80 ml. of chloroform. 2 ml. of water are then added slowly whereupon the temperature rises. Care is taken, by cooling, that it does not rise above 10°. Sodium sulphate is then added, the reaction mixture is filtered and the filtrate is evaporated in a rotary evaporator, finally for 5 minutes under high vacuum whereupon 4-piperidone remains.

9 g. of magnesium are placed in 20 ml. of ether, 0.1 g. of mercury chloride are added and, at —10 to —5°, 44.5 g. of propargyl bromide in 100 ml. of abs. ether are added dropwise. The whole is then stirred for 20 minutes at —5°. 28.95 g. of 4-piperidone in 250 ml. of abs. benzene are then added dropwise at —5° to 0° whereupon the temperature of the reaction mixture rises. It is stirred for 30 minutes at 0° and then for about 14 hours at room temperature. Ice and glacial acetic acid are then added, the benzene phase is removed and extracted with 2 N acetic acid. The acetic acid solutions are combined, shaken with ether and then made alkaline. The base liberated is extracted with chloroform, and the chloroform solution is dried and concentrated whereupon 9.3 g. of an oil remain. Distillation yields an oil which boils at 100–140°/0.05 (airbath) which crystallises. The 4-(2'-propinyl)-4-piperidinol so obtained melts at 76–78°.

(b) 1.6 g. of the product according to (a) are left to stand in 16 ml. of 2 N sulphuric acid and 200 mg. of mercury sulphate for 3 hours at room temperature. The reaction mixture is made alkaline, extracted with chloroform and the chloroform solution is dried and concentrated. The residue is distilled in a bulb tube whereupon 1-(4'-hydroxy-4'-piperidyl)-2-propanone is obtained, M.P. 98–100°.

(c) 1 g. of 1-(4'-hydroxy-4'-piperidyl)-2-propanone is dissolved in 5 ml. of concentrated sulphuric acid whereupon an exothermic reaction takes place and the mixture becomes dark colored. The solution is then heated for 5–10 minutes at 60–80° whereupon it is poured onto ice, made alkaline with concentrated sodium hydroxide solution and extracted with chloroform. After drying and concentrating the solution, the residue is distilled under high vacuum. The 1-(1',2',3',6'-tetrahydro-4'-pyridyl)-2-propanone passes over at 80–90° under 0.01 torr (airbath temperature).

EXAMPLE XV 11.3 g. of 1-methyl-4-piperidone, 21.6 g. of 2-butanone and 30 g. of Amberlite IRA 400 (OH$^\ominus$ form, which has been stirred for 15 hours at room temperature with 2 N sodium hydroxide solution), in 30 ml. of propanol are refluxed for 15 hours. The ion exchanger is then filtered off, the filtrate is concentrated and the residue is distilled under high vacuum whereupon 1-(1'-methyl-1',2',3',6'-tetrahydro-4'-pyridyl)-2-butanone is obtained. B.P.$_{12}$ 110–118°. The citrate produced analogously to Example V melts at 135–136°.

EXAMPLE XVI (a) 11.3 g. of 1-methyl-4-piperidone (0.1 mol) and 21.6 g. of 2-butanone (0.3 mol), 4 g. of ammonium acetate and 5.2 g. of glacial acetic acid in 60 ml. of abs. benzene are boiled in a water separator for 15 hours. The benzene is then evaporated off, the residue is made alkaline and extracted with chloroform. The chloroform solution is dried and concentrated. On distilling under high vacuum, 1-(1'-methyl-1',2',3',6'-tetrahydro-4'-pyridyl)-2-butanone is obtained as an oil, B.P.$_{0.01}$ 65–75°. The citrate melts at 135–136°; cf. Examples V and XV.

(b) 1-(1'-methyl-1',2',3',6'-tetrahydro - 4' - pyridyl)-2-pentanone is produced in an analogous manner, B.P.$_{0.01}$ 60–67°. The citrate melts at 134–136°, cf. Example V.

EXAMPLE XVII (a) 120 g. of acetophenone and 99 g. of cyclohexylamine in 300 ml. of abs. toluene are heated for 20 hours in a water separator. The yellow reaction solution is concentrated and the residue distilled under high vacuum whereupon the Schiff's base, acetophenone-N-cyclohexylimine is obtained. B.P.$_{0.001}$ 90–91°.

(b) 0.6 g. of lithium in 100 ml. of abs. ether are placed in a three-necked flask under an atmosphere of nitrogen and about a third of the solution of 6.75 g. of bromobenzene in 50 ml. of abs. ether is added dropwise while stirring. The reaction is started by heating in a water bath and then the remaining bromobenzene is added dropwise. The dark brown solution is refluxed for 30 minutes. The phenyl lithium solution is poured into a four-necked flask and cooled to —10°. 4.35 g. of diisopropylamine in 5 ml. of abs. ether are added dropwise within 15 minutes while stirring whereupon a greenish suspension is formed. After another 10 minutes 8.5 g. of the Schiff's base obtained according to (a) in 10 ml. of abs. ether are added dropwise at 0° and the whole is stirred for another 15 minutes. 4.8 g. of 1-methyl-4-piperidone in 5 ml. of abs. ether are added dropwise and the mixture is stirred for another 15 hours. Water is then added, the phases are separated and the ethereal phase is washed with water, dried and concentrated. The crystal slurry is stirred with ether and filtered. The α-(1-methyl-4-hydroxy-4-piperidyl)-acetophenone - N - cyclohexylimine obtained melts at 110–111°.

(c) 0.5 g. of the product obtained according to (b) in 5 ml. of concentrated sulphuric acid are heated for 30 minutes at 60°. The reaction mixture is made alkaline and extracted with chloroform, dried and concentrated. On distilling under high vacuum, α-(1'-methyl- 1',2',3',6'-tetrahydro-4'-pyridyl)-acetophenone is obtained, the citrate of which melts at 143–145°, cf. Example V.

EXAMPLE XVIII (a) 10 g. of mercury are added to 4.05 g. of a coarse aluminum turnings and the two components are well mixed with a stirrer. The unused mercury is then decanted off. The amalgamated aluminum in 25 ml. of abs. tetrahydrofuran and 15 ml. of abs. benzene is boiled for a short time with 15 mg. of mercury chloride and then stirred for 15 minutes. Of, in all, 20.5 ml. of propargyl bromide, enough is added alone without solvent at 50–60° to start the reaction and raise the temperature towards 70°; then the rest of the propargyl bromide, diluted with 35 ml. of abs. benzene, is added. The mixture is stirred for 30 minutes after which 50 g. of 1-($\beta$-phenylethyl)-4-piperidone in 150 ml. of abs. benzene are slowly added dropwise at 20–25° while cooling with ice and the mixture is stirred for another 15 hours. It is then decomposed with ice and 2 N hydrochloric acid, the aqueous phase is separated, washed with chloroform, made alkaline with concentrated sodium hydroxide solution and the base liberated is taken up in chloroform. The chloroform solution is dried and concentrated and the residue is distilled whereupon 1 - ($\beta$ - phenylethyl) - 4-(2'-propinyl)-4-piperidinol is obtained. B.P.$_{0.03}$ 130–140°.

The following compounds, for example, are obtained in an analogous manner:

1-benzyl-4-(2'-propinyl)-4-piperidinol, B.P.$_{0.03}$ 128–135°,
1-methyl-4-(2'-propinyl-4-piperidinol, M.P. 91–93°,
1-methyl-4-(1'-methyl-2'-propinyl)-4-piperidinol,
  B.P.$_{0.01}$ 75–78°,
1-ethyl-4-(2'-propinyl)-4-piperidinol,
1-n-butyl-4-(2'-propinyl)-4-piperidinol,
1-n-dodecyl-4-(2'-propinyl)-4-piperidinol,
1-($\alpha$-methyl-$\beta$-phenylethyl)-4-(2'-propinyl)-4-piperidinol,
1-($\gamma$-phenylpropyl)-4-(2'-propinyl)-4-piperidinol.

(b) 12 g. of 1 - ($\beta$-phenylethyl) - 4-(2'-propinyl)-4-piperidinol are slowly added to 35 ml. of concentrated sulphuric acid which contain 350 mg. of mercury sulphate and the mixture is heated for 6 hours at 50°. It is then poured onto ice, made alkaline with concentrated sodium hydroxide solution and extracted with chloroform. The chloroform solution is washed with saturated sodium chloride solution, dried and concentrated and the residue is distilled under high vacuum. The 1 - [1'-($\beta$-phenylethyl)-1',2',3',6'-tetrahydro-4'-pyridyl] - 2 - propanone passes over at 140° under 0.01 torr.

The hydrochloride precipitated from a solution of the base in isopropanol/ether by means of ethereal hydrogen chloride solution melts, after recrystallisation from isopropanol/ether at 177–179°, cf. Example V.

The following compounds, for example, are obtained in an analogous manner:

1-(1'-benzyl-1',2',3',6'-tetrahydro-4'-pyridyl)-2-propanone, hydrochloride, M.P. 184–186°.
1-(1'-methyl-1',2',3',6'-tetrahydro-4'-pyridyl)-2-propanone, B.P.$_{0.01}$ 65–68°, citrate M.P. 153–154° (obtained analogously to Example V),
3-(1'-methyl-1',2',3',6'-tetrahydro-4'-pyridyl)-2-butanone, B.P.$_{0.01}$ 55°, citrate M.P. 105–107°,
1-(1'-ethyl-1',2',3',6'-tetrahydro-4'-pyridyl)-2-propanone, citrate M.P. 131–132°,
1-(1'-n-butyl-1',2',3',6'-tetrahydro-4'-pyridyl)-2-propanone,
1-(1'-n-dodecyl-1',2',3',6'-tetrahydro-4'-pyridyl)-2-propanone,
1-[1'-($\alpha$-methyl-$\beta$-phenylethyl)-1',2',3',6'-tetrahydro-4'-pyridyl]-2-propanone,
1-[1'-($\gamma$-phenylpropyl)-1',2',3',6'-tetrahydro-4'-pyridyl]-2-propanone.

EXAMPLE XIX 8.35 g. of 1-methyl-4-(1'-methyl-2'-propinyl)-4-piperidinol (cf. Example XVIII(a)) are slowly added, while cooling, to 25 g. of 84% sulphuric acid and 0.4 g. of mercury sulphate and the whole is stirred for 24 hours at room temperature. The mixture is then poured onto ice, made alkaline with concentrated sodium hydroxide solution and extracted with chloroform. The chloroform solution is washed with saturated sodium chloride solution, dried, concentrated and the residue is distilled. The 3-(1'-methyl-methyl - 1',2',3',6' - tetrahydro-4'-pyridyl)-2-butanone passes over at 55° under 0.01 torr. The citrate melts at 105–107°, see also Example XVIII(b).

The following compounds for example, can be obtained by the methods described in Examples XVIII and XIX:

1-(1'-methyl-1',2',3',6'-tetrahydro-4'-pyridyl)-2-butanone, citrate M.P. 135–136°,
1-(1'-methyl-1',2',3',6'-tetrahydro-4'-pyridyl)-2-pentanone, citrate M.P. 131–133°,
1-(1'-methyl-1',2',3',6'-tetrahydro-4'-pyridyl)-2-hexanone, citrate M.P. 117–119°,
1-(1'-n-propyl-1',2',3',6'-tetrahydro-4'-pyridyl)-2-propanone, hydrochloride M.P. 148–149°,

EXAMPLE XX (a) 8.85 g. of 1-ethyl-4-(2'-propinyl)-4-piperidinol are dissolved in 90 ml. of abs. chloroform and 4 ml. of thionyl chloride are slowly added dropwise while stirring. An exothermic reaction takes place and the solution becomes dark colored. It is then refluxed for 4 hours. After evaporating in a rotary evaporator, the residue is made alkaline with concentrated sodium hydroxide solution and extracted with ether. The ether solution is dried and concentrated. On distilling the residue under high vacuum, 1-ethyl - 4-(2'-propinyl) - 1,2,3,6-tetrahydropyridine is obtained which boils at 60–66°/0.01. The citrate melts at 127–128°.

(b) 1 g. of crude 1-ethyl-4-(2'-propinyl)-1,2,3,6-tetrahydropyridine, which contains 1 - ethyl - 4 - (2'-propinylidene)-piperidine as impurity, 4 ml. of 25% sulphuric acid and 50 mg. of mercury-II-sulphate are heated for 4 hours at 60°. After cooling, the mixture is made alkaline and extracted with chloroform, the chloroform solution is dried and concentrated and the residue is distilled in vacuo. The fraction passing over at 95–100°/12 torr is dissolved in acetone and an acetone solution of citric acid is added until the pH is 4. The crude citrate is filtered off under suction and recrystallised from acetone/methanol. The citrate of 1-(1'-ethyl-1',2',3',6'-tetrahydro-4'-pyridyl)-2-propanone obtained melts at 131–132, cf. Example XVIII.

EXAMPLE XXI 2 g. of 1-(1',2',3',6'-tetrahydro-4'-pyridyl)-2-propanone (cf. Example XV) are dissolved in 8 ml. of ethanol, 6 ml. of benzyl bromide are added and the whole is left to stand for 24 hours. The solution, which has an acid reaction, is then extracted with ether, the aqueous phase is made alkaline and extracted with chloroform. The chloroform solution is dried, concentrated and the residue is distilled under high vacuum. The 1 - (1' - benzyl-1',2',3',6'-tetrahydro-4'-pyridyl)-2-propanone passes over under 0.01 torr at 120–140° air bath temperature. The hydrochloride melts at 184–186°, cf. Example V.

On using 4 ml. of allyl bromide, 1-(1'-allyl-1',2',3',6'-tetrahydro - 4' - pyridyl)-2-propanone, B.P.$_{0.01}$ 70–80°, citrate M.P. 75–78°, and on using 3 ml. of methyl iodide, 1 - (1' - methyl - 1',2',3',6' - tetrahydro - 4' - pyridyl)-2-propanone, B.P.$_{0.01}$ 65–68°, citrate M.P. 153–154°, are obtained in an analogous manner.

EXAMPLE XXII 2 g. of 1-(1',2',3',6'-tetrahydro-4'-pyridyl)-2-propanone (cf. Example XV), 4 g. of $\gamma$-phenylpropyl bromide, 1 g. of potassium iodide and 1 g. of potassium carbonate in 25 ml. of acetone are refluxed for 4 hours. The reaction mixture is then concentrated, a little water is added and the alkaline solution is extracted with chloroform. The chloroform solution is dried, concentrated in vacuo and the residue is distilled under high vacuum whereupon 1 - [1' - (γ-phenylpropyl) - 1',2',3',6' - tetrahydro - 4'-pyridyl]-2-propanone is obtained.

The following compounds, for example, are obtained in an analogous manner:

1-(1'-cyclopropylmethyl-1',2',3',6'-tetrahydro-4'-pyridyl)-2-propanone, using 5 g. of iodomethyl-cyclopropany cf. J. Am. Chem. Soc. 85, 1886 (1963)), 1-(1'-n-hexyl-1',2',3',6'-tetrahydro-4'-pyridyl)-2-propanone, on using 4 ml. of n-hexyl bromide, and 1-(1'-n-dodecyl-1',2',3',6'-tetrahydro-4'-pyridyl)-2-propanone, on using 8 ml. of n-dodecyl bromide.

What is claimed is:

1. A compound selected from the group consisting of a ketone of the formula

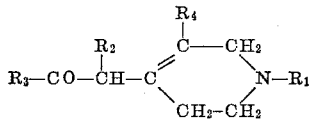

wherein $R_1$ is a member selected from the group consisting of alkyl of at most 12 carbon atoms, alkenyl of from 3 to 5 carbon atoms, cyclopropylmethyl and phenylalkyl of from 7 to 9 carbon atoms;

$R_2$ is a member selected from the group consisting of hydrogen and methyl;

$R_3$ is a member selected from the group consisting of alkyl of at most 4 carbon atoms, phenyl, phenylalkyl having a total of 7 to 9 carbon atoms, and styryl; and $R_2$ and $R_3$, taken together, represent a member selected from the group consisting of tetramethylene and 1-methyl-tetramethylene; and $R_4$ is a member selected from the group consisting of hydrogen and methyl;

and a pharmaceutically acceptable acid addition salt thereof.

2. A compound as defined in claim 1, wherein $R_1$ and $R_3$ are each methyl, and $R_2$ and $R_4$ are each hydrogen.

3. A compound as defined in claim 1, wherein $R_1$ is methyl, $R_3$ is ethyl, and $R_2$ and $R_4$ are each hydrogen.

4. A compound as defined in claim 1, wherein $R_1$ is methyl, $R_3$ is propyl, and $R_2$ and $R_4$ are each hydrogen.

5. A compound as defined in claim 1, wherein $R_1$ is methyl and $R_2$ and $R_4$ area each hydrogen, and $R_3$ is isopropyl.

6. A compound as defined in claim 1, wherein $R_1$ and $R_2$ are each methyl, $R_3$ is ethyl and $R_4$ is hydrogen.

7. A compound as defined in claim 1, wherein $R_1$ is methyl, $R_3$ is phenyl, and $R_2$ and $R_4$ are each hydrogen.

8. A compound as defined in claim 1, wherein $R_1$ is methyl, $R_2$ and $R_4$ are each hydrogen, and $R_3$ is isopropyl.

References Cited

Chemical Abstracts, vol. 65, par. 16,948-g to 16,949-b (1966).

HENRY R. JILES, Primary Examiner

A. L. ROTMAN, Assistant Examiner

U.S. Cl. X.R.

260—240, 294.3, 294.8, 295; 424—263, 266